US010440263B2

(12) United States Patent
Long et al.

(10) Patent No.: US 10,440,263 B2
(45) Date of Patent: Oct. 8, 2019

(54) SYNCHRONIZED DISPLAY ON HINGED MULTI-SCREEN DEVICE

(71) Applicant: Microsoft Technology Licensing, LLC, Redmond, WA (US)

(72) Inventors: Donna Katherine Long, Redmond, WA (US); Andrew Austin Jackson, Bellevue, WA (US); Charlene Jeune, Redmond, WA (US); Christian Michael Sadak, Seattle, WA (US); Mario Emmanuel Maltezos, Redmond, WA (US); Bryant Daniel Hawthorne, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 15/627,341

(22) Filed: Jun. 19, 2017

(65) Prior Publication Data
US 2018/0332216 A1 Nov. 15, 2018

Related U.S. Application Data

(60) Provisional application No. 62/505,774, filed on May 12, 2017.

(51) Int. Cl.
H04N 5/232 (2006.01)
H04N 5/225 (2006.01)
(Continued)

(52) U.S. Cl.
CPC ....... *H04N 5/23222* (2013.01); *G06F 1/1618* (2013.01); *G06F 1/1641* (2013.01);
(Continued)

(58) Field of Classification Search
None
See application file for complete search history.

(56) References Cited

U.S. PATENT DOCUMENTS 6,081,207 A 6/2000 Batio
6,280,039 B1 8/2001 Barber
(Continued)

FOREIGN PATENT DOCUMENTS

EP 2720141 A1 4/2014
GB 2403371 A 12/2004
WO 2013155207 A1 10/2013

OTHER PUBLICATIONS

"StudioPrompter Lite Teleprompter Software", http://drs-digitrax.com/studiopromperlite.htm, Published on: 1997, 1 page.
(Continued)

Primary Examiner — Mark T Monk
(74) Attorney, Agent, or Firm — Alleman Hall Creasman & Tuttle LLP

(57) ABSTRACT

A mobile computing device is provided that comprises a housing having a first part and a second part coupled by a hinge, the first part including a first display and the second part including a second display, wherein the hinge is configured to permit the first and second displays to rotate between angular orientations from a face-to-face angular orientation to a back-to-back angular orientation. The mobile computing device further includes a camera mounted in the first part of the housing and configured to capture image data, the camera and the first display both facing a first direction, and a processor mounted in the housing. In the back-to-back angular orientation, the processor is configured to cause the second display to display the image data while simultaneously causing the first display to display the image data and secondary content.

20 Claims, 12 Drawing Sheets

(51) Int. Cl.
 *G06F 1/16* (2006.01)
 *G10L 15/26* (2006.01)
 *G06F 3/16* (2006.01)
 *G06F 3/14* (2006.01)
 *H04N 5/222* (2006.01)
 *G09G 5/12* (2006.01)
 *G10L 15/24* (2013.01)

(52) U.S. Cl.
 CPC .......... *G06F 1/1647* (2013.01); *G06F 1/1677* (2013.01); *G06F 1/1681* (2013.01); *G06F 1/1686* (2013.01); *G06F 3/1423* (2013.01); *G10L 15/26* (2013.01); *H04N 5/2222* (2013.01); *H04N 5/2257* (2013.01); *H04N 5/225251* (2018.08); *H04N 5/23219* (2013.01); *H04N 5/232939* (2018.08); *G09G 5/12* (2013.01); *G10L 15/24* (2013.01); *G10L 15/265* (2013.01)

(56) References Cited

U.S. PATENT DOCUMENTS

| | | | |
|---|---|---|---|
| 6,295,038 | B1 | 9/2001 | Rebeske |
| 7,136,282 | B1 | 11/2006 | Rebeske |
| 7,626,630 | B2 * | 12/2009 | Nishino .............. H04M 1/0216 348/333.06 |
| 8,847,984 | B2 | 9/2014 | Boorman et al. |
| 8,994,671 | B2 | 3/2015 | Reeves et al. |
| 9,351,334 | B1 | 5/2016 | Kotab |
| 2005/0097179 | A1 * | 5/2005 | Orme .................... H04L 51/12 709/207 |
| 2008/0024388 | A1 | 1/2008 | Bruce |
| 2008/0062625 | A1 | 3/2008 | Batio |
| 2008/0247128 | A1 | 10/2008 | Khoo |
| 2008/0292265 | A1 * | 11/2008 | Worthen .............. G11B 27/034 386/282 |
| 2011/0254846 | A1 * | 10/2011 | Lee ........................ G06F 3/011 345/427 |
| 2012/0032981 | A1 | 2/2012 | Hackwell |
| 2013/0021266 | A1 * | 1/2013 | Selim .................... G06F 3/0487 345/173 |
| 2014/0196101 | A1 | 7/2014 | Hendrickson et al. |
| 2015/0271310 | A1 * | 9/2015 | Kitatani .............. H04M 1/7253 455/41.1 |
| 2016/0062557 | A1 * | 3/2016 | Kim ...................... G06F 3/0481 715/748 |
| 2016/0062970 | A1 * | 3/2016 | Sadkin ................ G06F 17/212 715/233 |

OTHER PUBLICATIONS

"Portable dual-screen teleprompter", http://broadcast-equipment.biz/teleprompter-dualscreen-p-218.html, Retrieved on: May 12, 2017, 3 pages.

"Use your iPhone as an Autocue Teleprompter!", http://www.autocue.com/iphone-teleprompter, Published on: Dec. 29, 2016, 2 pages.

"Magicue Software for Studio and Presidential Prompters (PC)", http://www.dracobroadcast.com/store/p282/Magicue_Software_for_Studio_and_Presidential_Prompters_%28PC%29.html, Retrieved on: May 12, 2017, 2 pages.

"Teleprompter Pro", https://www.microsoft.com/en-vi/store/p/teleprompter-pro/9wzdncrfjss3, Retrieved on: May 12, 2017, 4 pages.

"International Search Report & Written Opinion Issued in PCT Application No. PCT/US2018/028736", dated Jul. 11, 2018, 11 Pages.

* cited by examiner

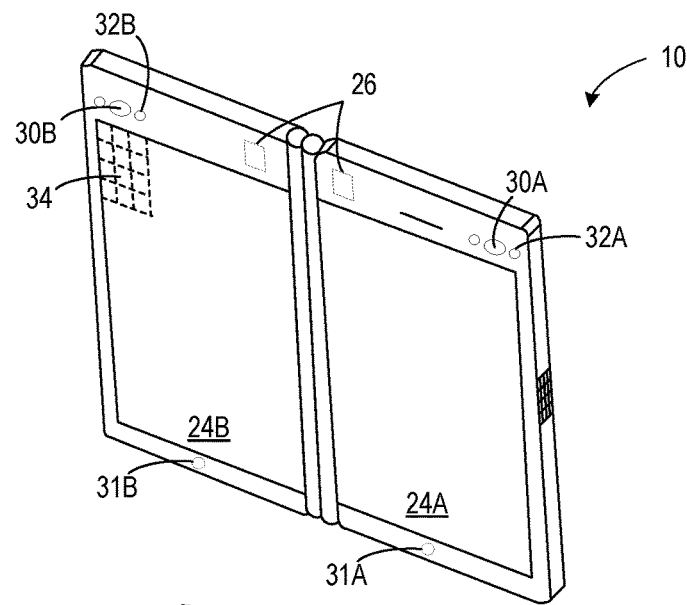
FIG. 2A
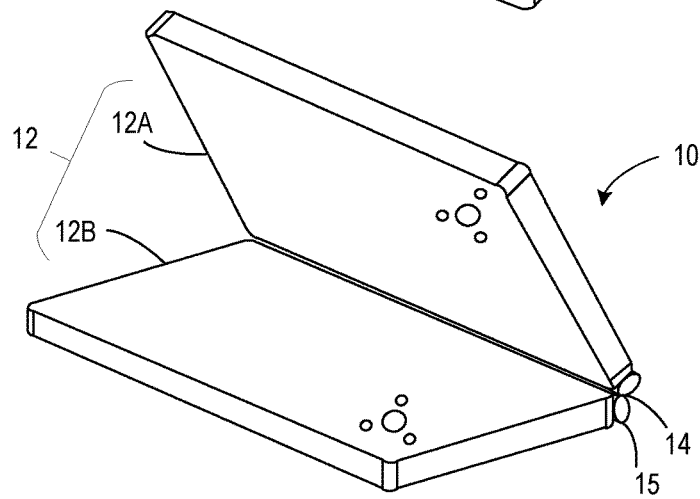
FIG. 2B
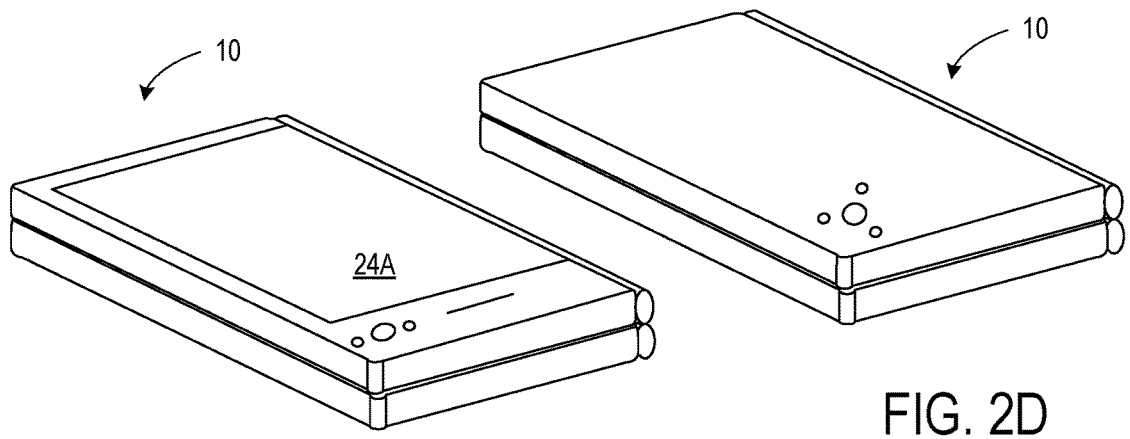
FIG. 2C
FIG. 2D

SYNCHRONIZED DISPLAY ON HINGED MULTI-SCREEN DEVICE

CROSS REFERENCE TO RELATED APPLICATIONS

This application claims priority to U.S. Provisional Patent Application No. 62/505,774 filed May 12, 2017, the entirety of which is hereby incorporated herein by reference.

BACKGROUND

Various devices allow a user to capture image data with a camera and provide the user with a display for viewing the captured content in real time. Accordingly, the user may smoothly change settings, direct the camera in a different direction, etc., in response to viewing the captured content without pausing filming. In order to provide a subject of the filming with feedback or instructions, large-scale devices such as teleprompters may be used, but are highly immobile, bulky, and expensive, and furthermore, typically display only text. However, providing the subject with similar visual feedback of the image data currently being captured typically requires additional devices.

SUMMARY

To address the above issues, a mobile computing device is provided. The mobile computing device may include a housing having a first part and a second part coupled by a hinge, the first part including a first display and the second part including a second display. The hinge may be configured to permit the first and second displays to rotate between angular orientations from a face-to-face angular orientation to a back-to-back angular orientation. The mobile computing device may further include a camera mounted in the first part of the housing and configured to capture image data, the camera and the first display both facing a first direction, and a processor mounted in the housing. In the back-to-back angular orientation, the processor may be configured to cause the second display to display the image data while simultaneously causing the first display to display the image data and secondary content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A shows an example of two displays of the mobile computing device of FIG. 1 arranged in a side-by-side orientation, while FIG. 2B shows an example of a reflex orientation, FIG. 2C shows an example of a back-to-back orientation, and FIG. 2D shows an example of a front-to-front orientation.

DETAILED DESCRIPTION

The inventors of the subject application have discovered that when attempting to mobilize and simplify videographic systems so that they are more easily attainable and usable by consumers, mobile computing devices with a camera may be used to provide visual feedback while filming. However, providing both the user directing the camera and the subject of the filming with coordinated feedback presents additional challenges. Most mobile computing device include only one screen, even if multiple cameras are present, and therefore multiple, separate devices must be synchronized if another user is to operate the camera, which complicates the setup and production of recording. Furthermore, such synchronization may be insufficient, leading to undesirable time delays between devices.

Figure 1:
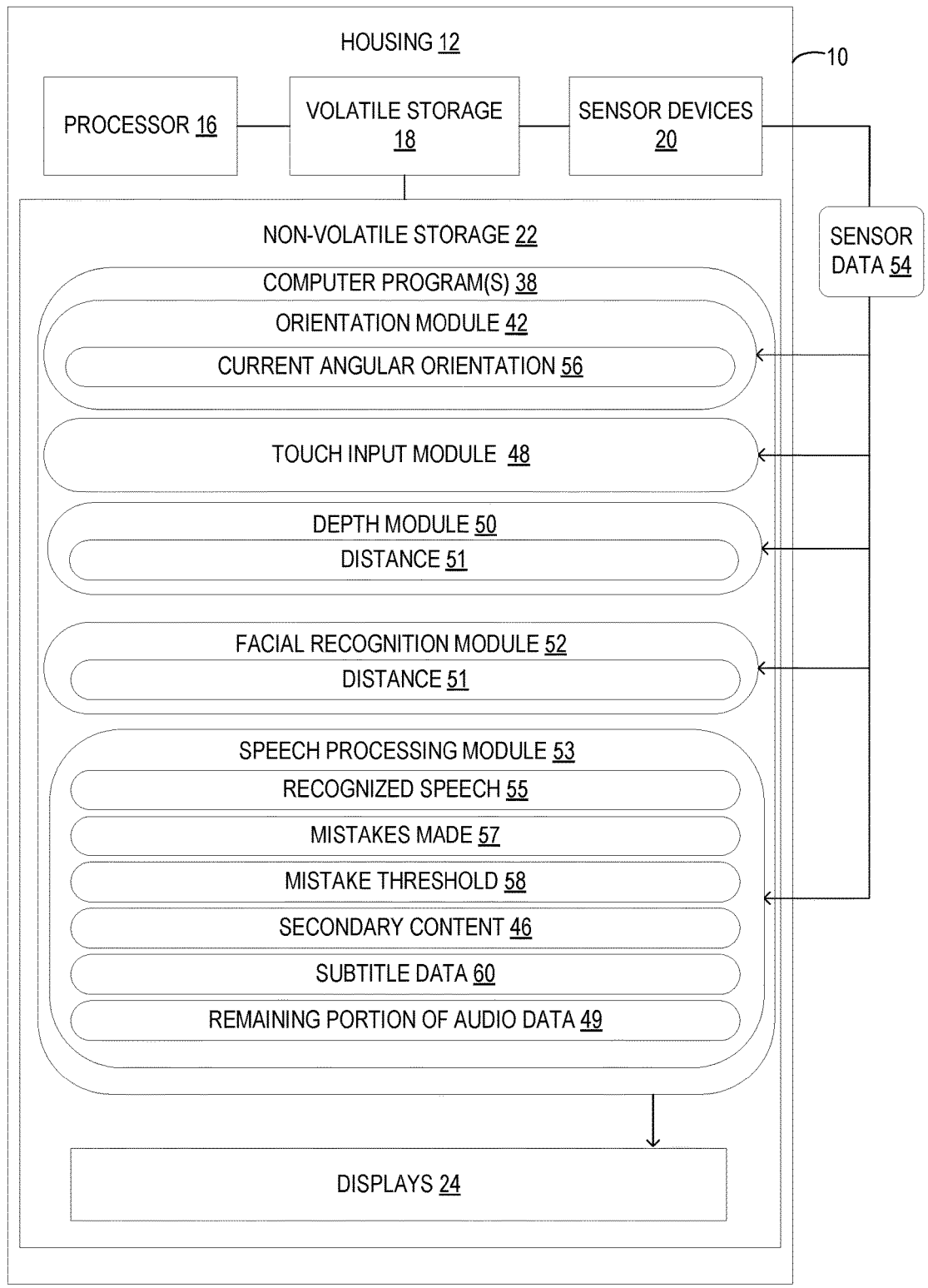
FIG. 1 shows an example mobile computing device of the present description.

As schematically illustrated in FIG. 1, to address at least the above identified issues, a mobile computing device 10 is provided. FIG. 1 illustrates a mobile computing device 10 that includes a housing 12, which, for example, may take the form of a casing surrounding internal electronics and providing structure for displays, sensors, speakers, buttons, etc. The mobile computing device 10 may include a processor 16 mounted in the housing 12. The housing 12 is further configured to include a volatile storage device 18, sensor devices 20, non-volatile storage device 22, and two or more displays 24. The mobile computing device 10 may, for example, take the form of a smartphone device. In other examples, the mobile computing device 10 may take other suitable forms, such as a tablet computing device, a wrist-mounted computing device, a head-mounted display device, etc.

Turning to FIGS. 2A-D, an example mobile computing device 10 is illustrated in various orientations. As shown, the example mobile computing device 10 includes the housing 12 having a first part 12A and a second part 12B coupled by a hinge 14. The first part 12A may include a first display 24A of the displays 24, and the second part 12B may include a second display 24B of the displays 24. In the illustrated mobile computing device 10, the two example displays 24A, 24B are movable relative to each other. The hinge 14 may be configured to permit the first and second displays 24A, 24B to rotate between angular orientations from a face-to-face angular orientation (see FIG. 2D) to a back-to-back angular orientation (see FIG. 2C). It will be appreciated that the face-to-face and back-to-back angular orientations may be approximately 0° and 360°, respectively, but may also include a tolerance, for example, ±10°. In one implementation, the face-to-face angular orientation is defined to have an angular displacement as measured from display to display of between 0-90 degrees, an open angular orientation is defined to be between 90-270 degrees, and a back-to-back orientation is defined to be from 270-360 degrees. Alternatively, an implementation in which the open orientation is not used to trigger behavior may be provided, and in this implementation, the face-to-face angular orientation may be defined to be between 0 and 180 degrees and the back-to-back angular orientation may be defined to be between 180 and 360 degrees. In either of these implementations, when narrower ranges are desired, the face-to-face angular orientation may be defined to be between 0 and 60 degrees, or more narrowly to be between 0 and 30 degrees, and the back-to-back angular orientation may be defined to be between 300-360 degrees, or more narrowly to be 330-360 degrees. The zero-degree position may be referred to as fully closed in the fully face-to-face angular orientation and the 360-degree position may be referred to as fully open in the back-to-back angular orientation. In implementations that do not use a double hinge and which are not able to rotate a full 360 degrees, fully open and/or fully closed may be greater than zero degrees and less than 360 degrees, for example ±10° as discussed above.

The sensor devices 20 may include a plurality of different sensors, such as, for example, at least one inertial measurement unit (IMU) 26 formed of one or more of an accelerometer, a gyroscope, and a magnetometer. The sensor devices 20 may further include a camera 30A (e.g., a forward-facing camera) mounted in the first part 12A of the housing 12, a camera 30B (e.g., a forward-facing camera) mounted in the second part 12B of the housing 12, depth cameras 32A, 32B, and/or two other cameras that may be rear-facing cameras. In one example, the forward-facing cameras 30A and 30B include RGB cameras. However, it will be appreciated that other types of cameras may also be included in the forward-facing cameras 30A and 30B, such as wide-angle cameras, fish-eye cameras, etc. In this example, "forward facing" is a direction of the camera's associated display device. Thus, in the example of FIG. 2A, as the screens for both of displays 24A, 24B are facing the same direction, both of the forward-facing cameras 30A and 30B are also facing the same direction. In addition, the sensor devices may include a capacitive touch sensor 34, such as a capacitive array that is integrated with each of the displays 24A, 24B. In the illustrated embodiment, the capacitive touch sensors 34 include a capacitive grid configured to sense changes in capacitance caused by objects on or near the displays, such as a user's finger, hand, stylus, etc. While the capacitive touch sensors 34 are illustrated in a capacitive grid configuration, it will be appreciated that other types of capacitive touch sensors and configurations may also be used, such as, for example, a capacitive diamond configuration. In another example, the sensor devices 20 may include camera-in-pixel sensors that are integrated with each of the displays 24A, 24B. Further, the sensor devices 20 may include at least one microphone, illustrated here as microphones 31A, 31B, or other type of audio sensor. It will be appreciated that the examples listed above are exemplary, and that other types of sensors not specifically mentioned above may also be included in the sensor devices 20 of the mobile computing device 10.

As shown in FIG. 2B, the hinge 14 permits the pair of displays 24A, 24B to rotate relative to one another such that an angle between the pair of displays 24A, 24B can be decreased or increased by the user via applying suitable force to the housing 12 of the mobile computing device 10.

From the angular orientation shown in FIG. 2B, the pair of displays 24A, 24B may be rotated until the pair of displays 24A, 24B reach a back-to-back angular orientation as shown in FIG. 2C.

As illustrated in FIG. 2C, while in an angular orientation where the pair of displays 24A, 24B are in a back-to-back angular orientation, the pair of displays 24A, 24B face away from each other. Thus, while using the mobile computing device 10, a single user may only be able to view one of the displays of the pair of displays 24A, 24B at a time. Additionally, while in a back-to-back angular orientation, many of the sensor devices 20 including forward-facing cameras 30A, 30B also face the same direction as their respective associated display, and thus also face away from each other in opposite directions.

Furthermore, as shown in FIG. 2D, the angular orientation between the pair of displays 24A, 24B may also rotate to a face-to-face orientation where the pair of displays 24A, 24B face each other. Such an angular orientation may help protect the screens of the displays.

Returning to FIG. 1, the processor 16 may be configured to execute one or more computer programs 38 which may be, for example, an operating system, control program, or application program for the mobile computing device 10 that is stored on the non-volatile storage device 22, and to enact various control processes described herein. In some examples, the processor 16, volatile storage device 18, and non-volatile storage device 22 are included in a System-On-Chip configuration.

The computer program(s) 38 executed by the processor 16 may include an orientation module 42, a touch input module 48, a depth module 50, a facial recognition module 52, and a speech processing module 53, to provide a few examples. It will be appreciated that each module may be a separate application program or may be suitably combined. As shown in FIG. 1, the orientation module 42 may be configured to receive sensor data 54 from the various sensor devices 20. Based on the sensor data 54, the orientation module 42 is configured to detect a current angular orientation 56 between the pair of displays 24A, 24B indicating that the pair of displays 24A, 24B are, for example, facing away from each other. As discussed previously, the angular orientation between the pair of displays 24A, 24B may rotate through angular orientations between a face-to-face angular orientation to a back-to-back angular orientation. Thus, the orientation module 42 is configured to detect a current angular orientation 56 indicating that the pair of displays 24A, 24B are facing away from each other, such as a back-to-back angular orientation.

The orientation module 42 may be configured to detect the current angular orientation 56 based on different types of sensor data 54. In one embodiment, the sensor data 54 may include motion data such as accelerometer, gyroscope, and/or magnetometer data received via the IMUs 26. As the user applies force to the housing 12 of the mobile computing device 10 to rotate the pair of displays 24A, 24B, the IMUs 26 may detect the resulting movement. Thus, based on motion data for a new rotation and a previously known angular orientation between the pair of displays 24A, 24B, the orientation module 42 may calculate a new current angular orientation 56 resulting after the user rotates the pair of displays 24A, 24B around the hinge 14. However, it will be appreciated that the current angular orientation 56 may also be calculated via other suitable methods. For example, the sensor devices 20 may further include a hinge angle sensor 15 in the hinge 14 that is configured to detect an angular orientation of the hinge 14, and thereby detect a current relative angular orientation or relative angular displacement of the pair of displays 24A, 24B. Thus, the mobile computing device 10 may include a sensor mounted in the housing 12 and configured to detect an angular orientation 56 of the pair of displays 24A, 24B, whether this sensor is the IMU(s) 26 or the hinge angle sensor 15.

The touch input module 48 of the computer program(s) 38 executed by the processor 16 may be configured to detect and process touch input based on touch input data included in the sensor data 54 received via the sensor devices 20 including the capacitive touch sensors 34. The capacitive touch sensors 34 of the displays 24A, 24B may detect touch inputs resulting from the user's thumb or fingers, etc., when the user is interacting with the screen of the display 24A or 24B.

Figure 3:
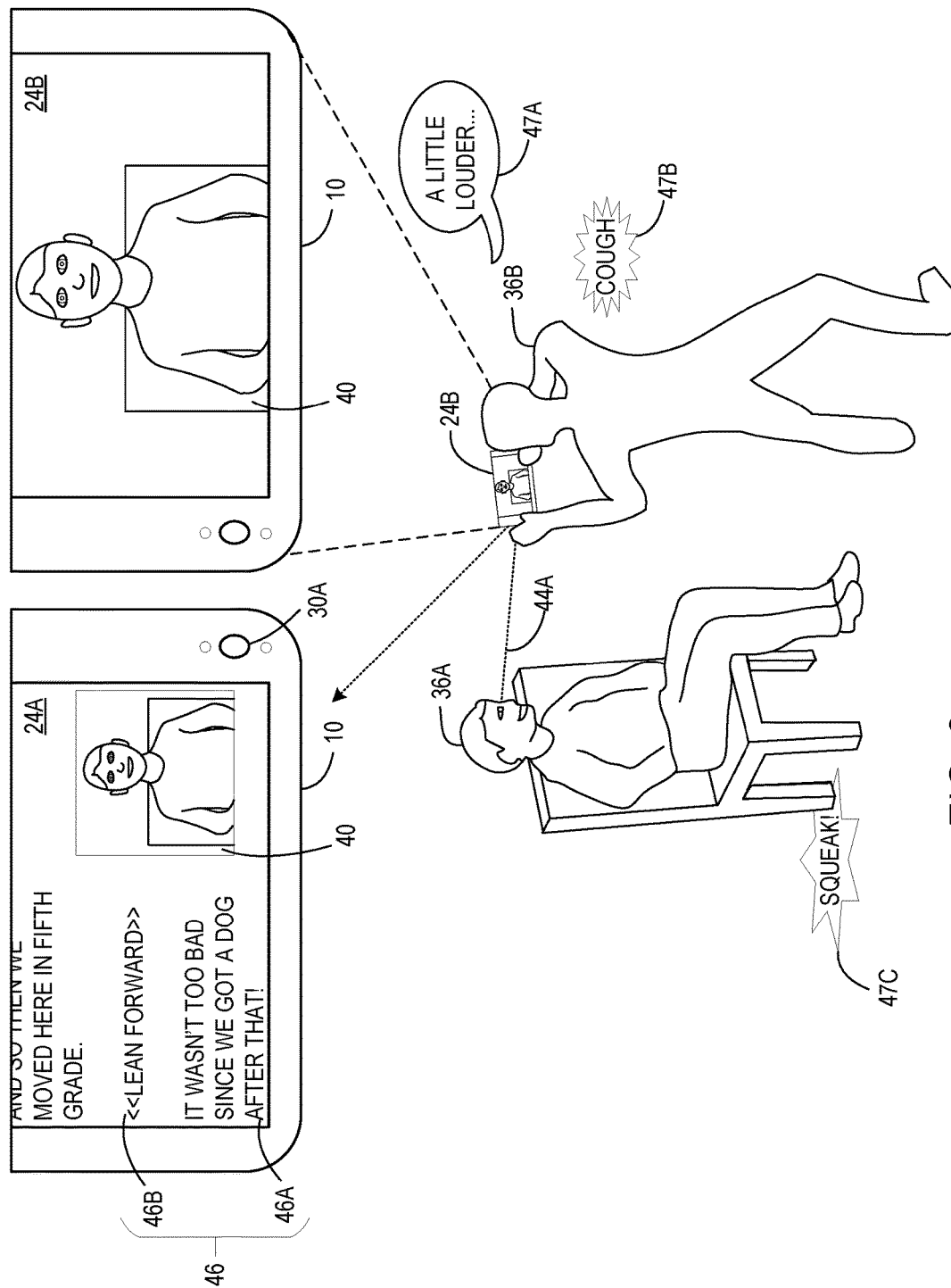
FIG. 3 shows a user capturing image data of a subject while both subject and user view respective displays of the mobile computing device of FIG. 1.

An example use case illustrating aspects of the present disclosure will now be presented with reference to FIG. 3. In the illustrated example, with the pair of displays 24A, 24B in the back-to-back angular orientation, the camera 30A is operated by a user 36B to capture image data 40 as the sensor data 54 while the camera 30A and the first display 24A both face a first direction 44A toward a subject 36A. The image data 40 may be video data, still image data, or a series of still image data, for example. Such image data 40 may be stored or streamed live via a network. While recording, the processor 16 may be configured to cause the second display 24B to display the image data 40 while simultaneously causing the first display 24A to display the image data 40 and secondary content 46. In this manner, visual feedback of the image data 40 currently being recorded may be provided to both the subject 36A and the user 36B without suffering from synchronization issues or requiring additional devices, setup work, or operators. In this example, the secondary content 46 includes text that is related to the image data 40; however, the secondary content 46 is not limited to text and may include pictures, video data, symbols, and icons, among other content that is related to the image data 40.

Figure 4:
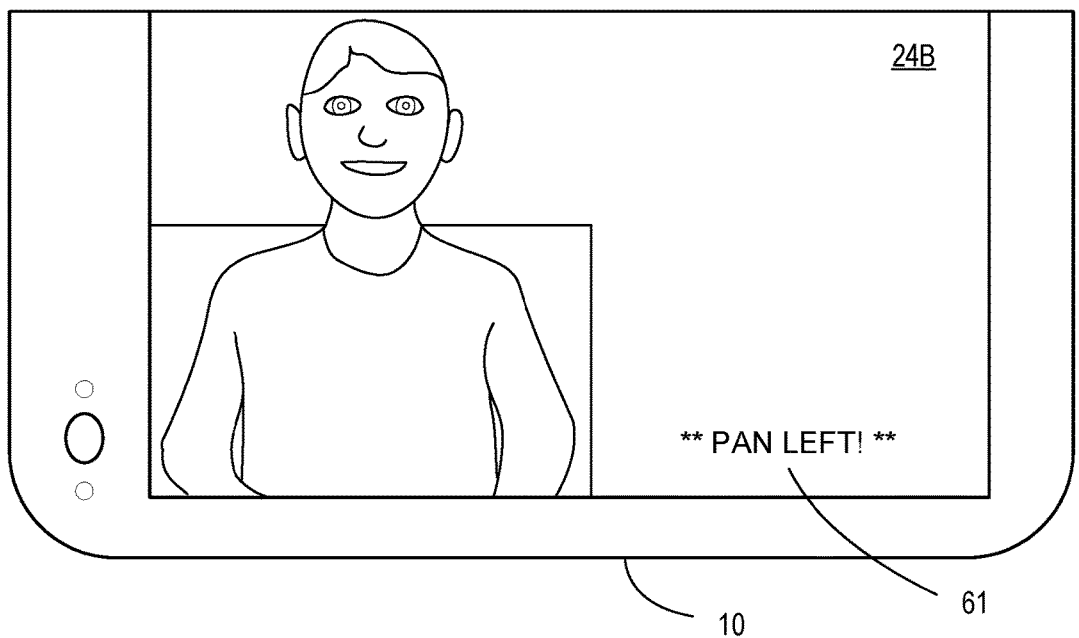
FIG. 4 shows an example videographer prompt displayed by the mobile computing device of FIG. 1.

In the illustrated example, the text includes speech prompts 46A and action prompts 46B for the subject 36a recorded in the image data 40. The prompts 46A, 46B may form a script, for example. The secondary content 46 may be stored in memory such as non-volatile storage 22 or removable storage in advance, or the computer program(s) 38 may allow the user 36B or another user to create or alter the secondary content 46 on-the-fly. The processor 16 may be further configured to cause the second display 24B to display videographer prompts 61, as shown in FIG. 4. The videographer prompts 61 may be stored in advance, input or altered by a user on-the-fly, or generated by one of the programs 38 in response to analyzed image data 40 and/or audio data. In the example of FIG. 4, the facial recognition module 52 has determined that the subject 36A is the subject of the image data 40 currently being captured, and has then determined that the camera 30A has likely strayed off center accidentally. In response, the speech processing module 53 or other module of the program(s) 38 has generated a videographer prompt 61 to instruct or notify the user 36B regarding the framing of the recorded scene. The videographer prompts 61 may be considered secondary content that is different from the secondary content 46 displayed on the first display 24A.

In addition, the processor 16 may be configured to execute the speech processing module 53 to recognize speech 55 from at least one of the image data 40 or audio data of sensor data 54 that is captured by the microphone 31A or 31B contemporaneously with the image data 40. Recognizing speech may include determining various features of the recognized speech 55 such as speed/rate, cadence, pitch/tone, regional accent, identity of speaker, and content, among other features. The recognized speech 55 can be utilized to provide a variety of functions, as discussed below.

In the example illustrated in FIG. 3, audio data may be captured by microphone 31A and/or 31B. The recognized speech 55 may be determined to belong to the subject 36A and not the user 36B or any other person. However, the audio data may include sounds other than just the recognized speech 55, such as: speech 47A of the user 36B, which may be determined to belong to the user 36B similarly to how the recognize speech 55 is determined to belong to the subject 36A, or may simply be determined to not be part of the recognized speech 55; sound 47B of the user 36B that is not speech, shown here as coughing; and sound 47C of the subject 36A that is not speech. In this case, the processor 16 may be configured to determine portions of the audio data that are not the recognized speech 55, such as the speech 47A, sound 47B, and sound 47C in FIG. 3. In order to provide a clear and polished audio track, the processor 16 may be configured to filter these portions from the audio data, and then store or transmit a remaining portion 49 of the audio data that does not include the filtered portions. The remaining portion 49 may be stored in memory for further processing, playback, or later transfer, or may be immediately streamed to another device for live or near-live (e.g., slightly delayed) playback, for example. It will be appreciated that not all sounds or speech other than the recognized speech 55 may be desired to be filtered from the audio data. Therefore, the processor 16 may include contextually aware filtering, the ability to override the filtering by a user, and adjustable settings for determining levels of filtering, for example.

Figure 5:
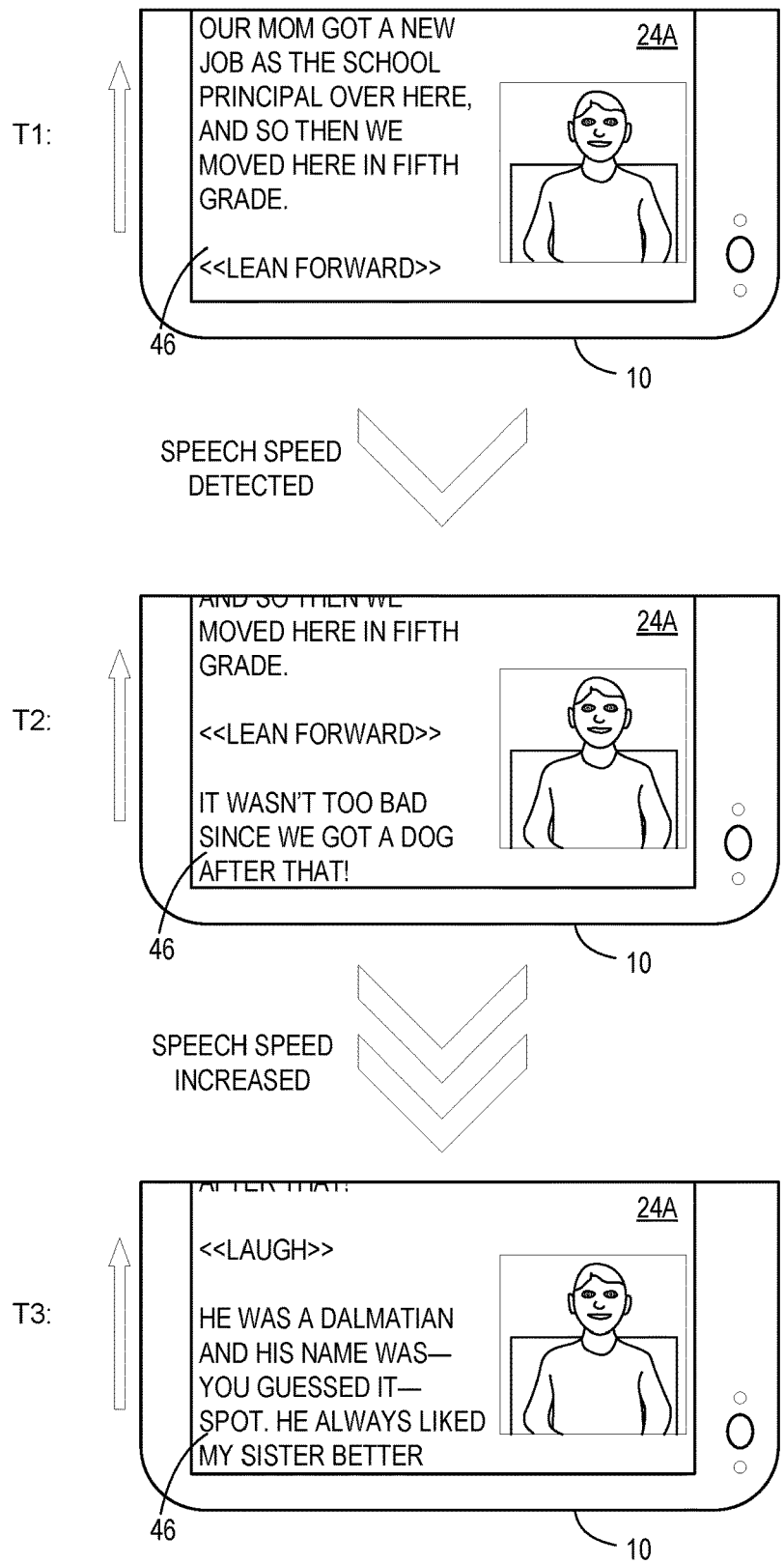
FIG. 5 shows an example speech prompt speed adjustment process of the mobile computing device of FIG. 1.

FIG. 5 shows an example speech prompt speed adjustment process of the mobile computing device 10. The mobile computing device 10 is currently being used in the situation illustrated in FIG. 3, and the subject 36A is viewing the secondary content 46. As the subject 36A speaks and is recorded by the microphone 31A and camera 30A, the secondary content 46 scrolls upward so that the subject 36A may smoothly proceed to read more and more text of the secondary content 46. Meanwhile, the speech processing module 53 produces the recognized speech 55, and further, correlates the speech prompts 46A to the recognized speech 55. From time T1 to time T2, the subject 36A is speaking at a first speed or rate, and the speed is determined by the speech processing module 53 by processing the recognized speech 55. The processor 16 may be configured to execute the speech processing module 53 to adjust a display progression of the speech prompts 46A according to a speed of the recognized speech 55. As illustrated, from time T2 to T3, the speech speed increases to a second speed. Accordingly, the progression of the secondary content 46 is sped up to provide the subject 36A with the next speech prompt 46A without causing awkward pauses. The display progression of the speech prompts 46A and action prompts 46B may also be slowed down or paused according to the speed of the recognized speech 55. The speech speed of the subject 36A may be determined by a threshold or spot-check correlation between the recognized speech 55 and speech prompts 46A, for example. The speech processing module 53 may anticipate a sound in the audio data based on the upcoming speech prompts 46A, and when the anticipated sound is not found in the recognized speech 55, the module 53 may check ahead or behind in the secondary content 46 for a match, may check for known alternatives to the anticipated sound, or may skip the sounds as an ad-lib or mistake, to provide merely a few examples.

Figure 6:
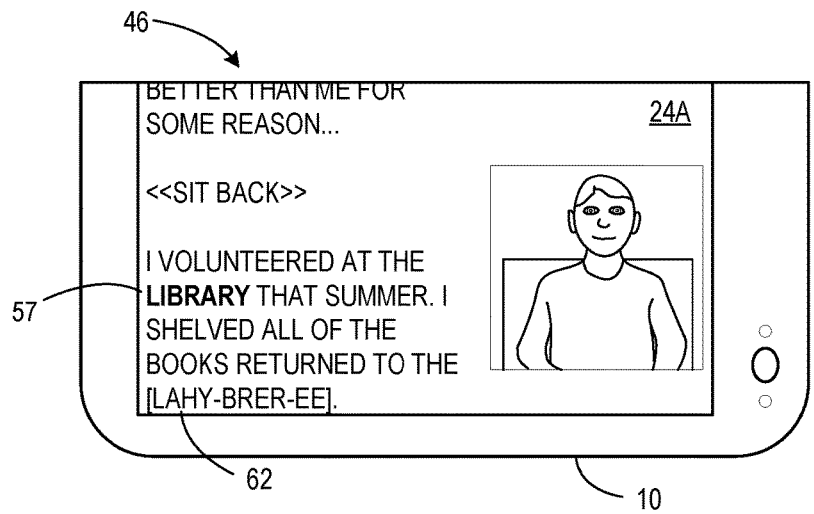
FIG. 6 shows an example of the mobile computing device of FIG. 1 converting speech prompts to a phonetic spelling in response to mistakes made.

FIG. 6 shows an example of the mobile computing device 10 converting speech prompts to a phonetic spelling in response to mistakes made. In FIG. 6, the subject 36A has mistakenly pronounced "library" as "library." The processor 16 may be configured to execute the speech processing module 53 to determine whether or not a mistake 57 is made in the recognized speech 55 compared to the speech prompts 46A. Here, the module 53 determines that a mistake 57 has been made. When a number of mistakes 57 made reaches a predetermined mistake threshold 58, the processor 16 may be configured to change the speech prompts 46A to include phonetic spelling 62 for designated words. The mistake threshold 58 may be suitably set to any desired number, and this phonetic spelling feature may further be turned off or on as desired. The phonetic spelling 62 may be provided in the place of the designated words, or may be provided in addition. Furthermore, the designated words may be words that are currently recognized as mistakes 57, words that match a list of predetermined commonly mistaken words, foreign origin loan words, names, and words spoken by the subject 36A or other user that have previously been recognized as mistakes 57 and stored in memory, for example. In this manner, the mobile computing device 10 may adapt to the current situation and provide the subject 36A with up-to-date and helpful secondary content 46.

Figure 7:
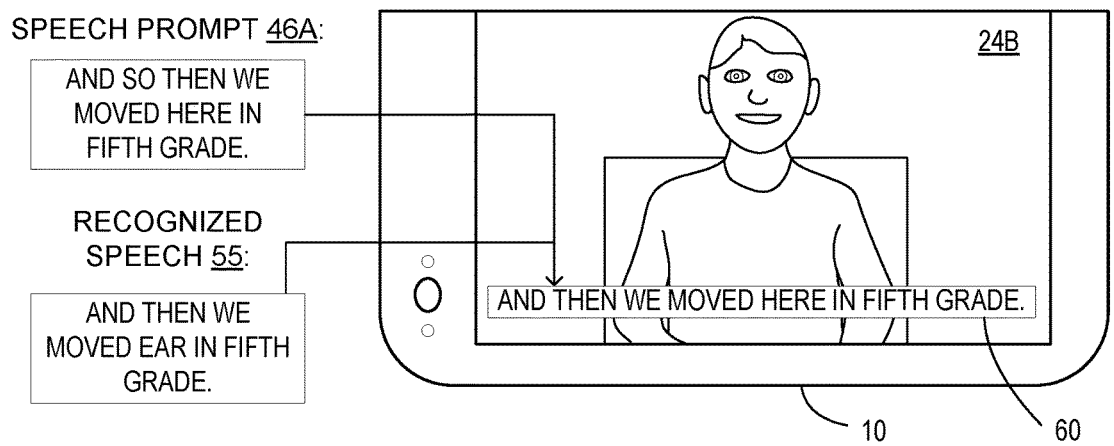
FIG. 7 shows an example of the mobile computing device of FIG. 1 generating subtitle data.

In some cases, the processor 16 may be further configured to generate subtitle data 60 from the correlated speech prompts 46A and recognized speech 55, as illustrated in FIG. 7. The subtitle data 60 is shown here displayed on the display 24B, but it will be appreciated that the subtitle data 60 may be stored or streamed with the image data 40 and audio data by another viewer, for example, in a media container file for coordinated playback or encoded into the image data 40. The subtitle data 60 may be generated by starting with the text of the speech prompts 46A and correcting the text by correlating with the recognized speech 55, or by starting with the text of the recognized speech and correcting the text by correlating with the speech prompts 46A. As shown in the example of FIG. 7, the speech processing module 53 generated the recognized speech 55 which differs from the speech prompt 46A in two respects, as identifiable in the final subtitle data 60. First, the subject 46A did not speak the word "so" that was present in the speech prompt 46A, and the recognized speech 55 incorrectly included the word "ear" in the place of the word "here." Mistakes in the recognized speech 55 may be differentiated from deviations from the speech prompt 46A by the subject 36A by taking context into account or comparing speech patterns to common or previously recorded speech patterns, for example. Accordingly, complete and accurate subtitle data 60 may be generated.

Figure 8:
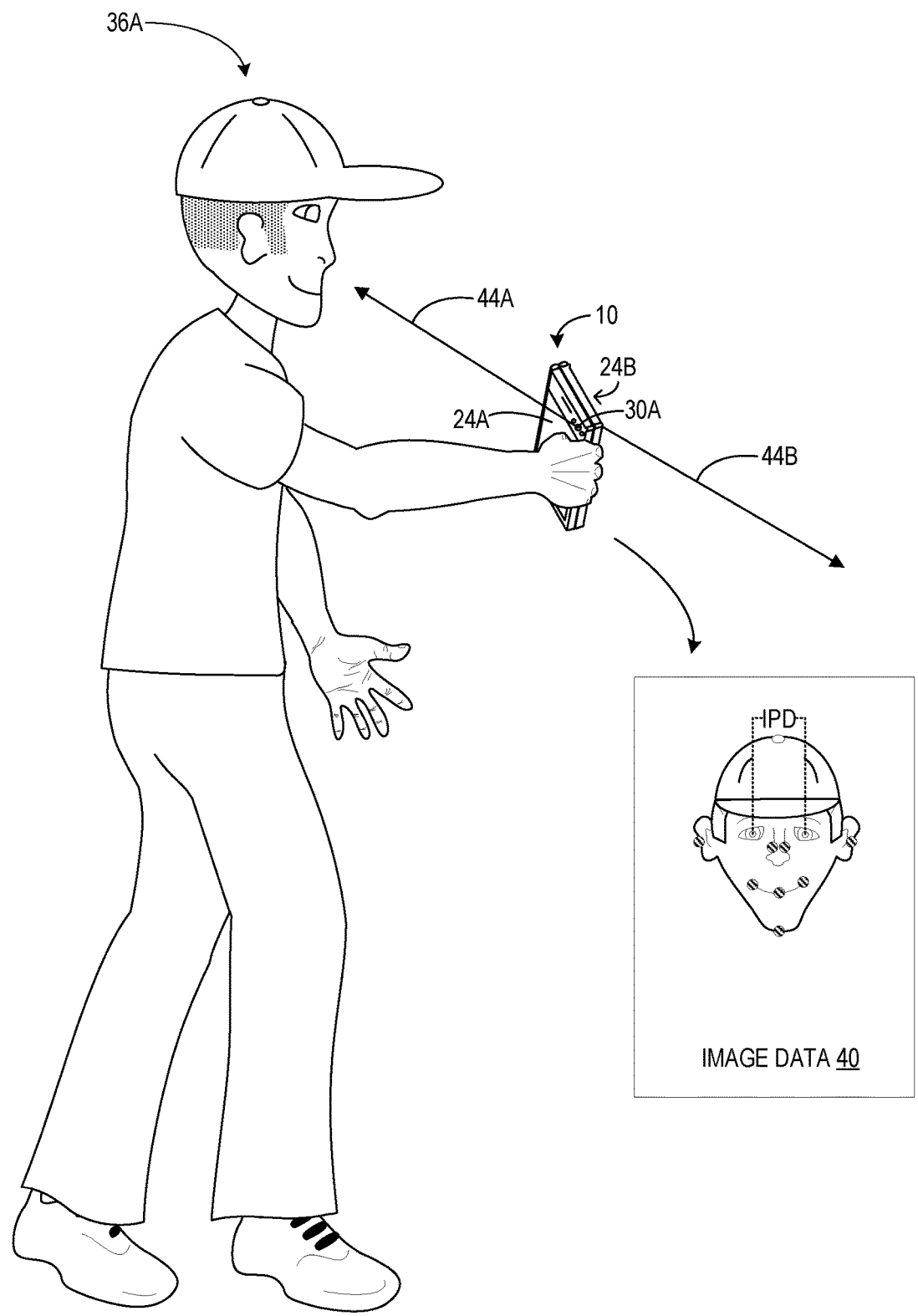
FIG. 8 shows an example facial recognition process of the mobile computing device of FIG. 1.

FIG. 8 shows an example facial recognition process of the mobile computing device 10. As shown, the displays 24A, 24B are oriented in the back-to-back angular configuration such that the display 24A and the camera 30A are facing in the first direction 44A toward the subject 36A, while the display 24B and the camera 30B are facing in a second direction 44B. The image data 40 captured by the camera 30A is sent to the facial recognition module 52 in the sensor data 54. The facial recognition module 52 of the computer program(s) 38 executed by the processor 16 may be configured to process and analyze the image data 40 for any objects that match a human facial profile. It will be appreciated that the facial recognition module 52 may utilize any suitable face recognition processes to detect human facial features in the image data 40 captured by the camera 30A. In one example, based on at least detecting facial features in the image data 40, the processor 16 may be configured to determine detect an interpupillary distance (IPD) to thereby estimate the distance from the camera 30A to the subject 36A.

Figure 9A:
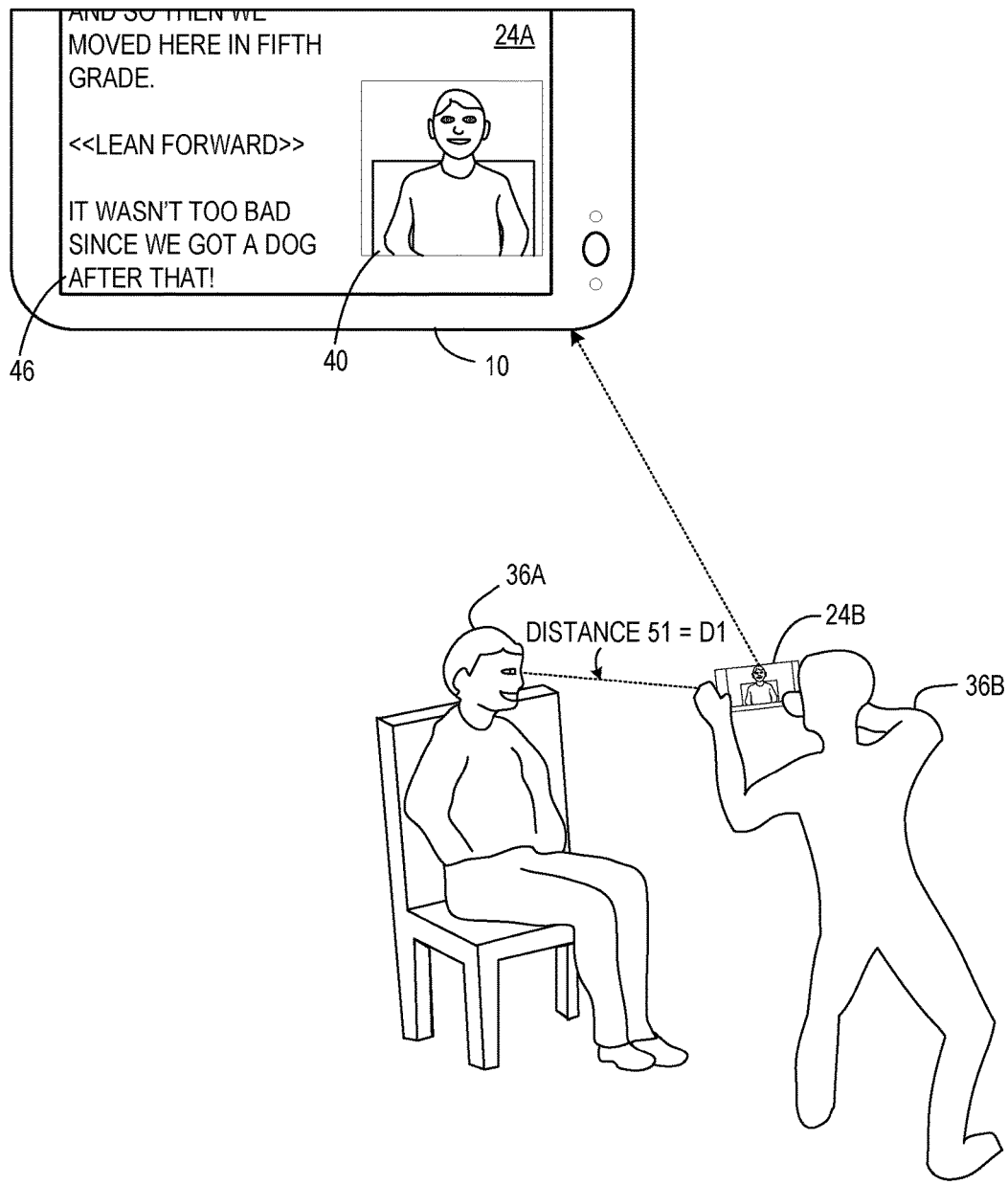
FIGS. 9A and 9B show the mobile computing device of FIG. 1 adjusting text size according to a change in distance.
Figure 9B:
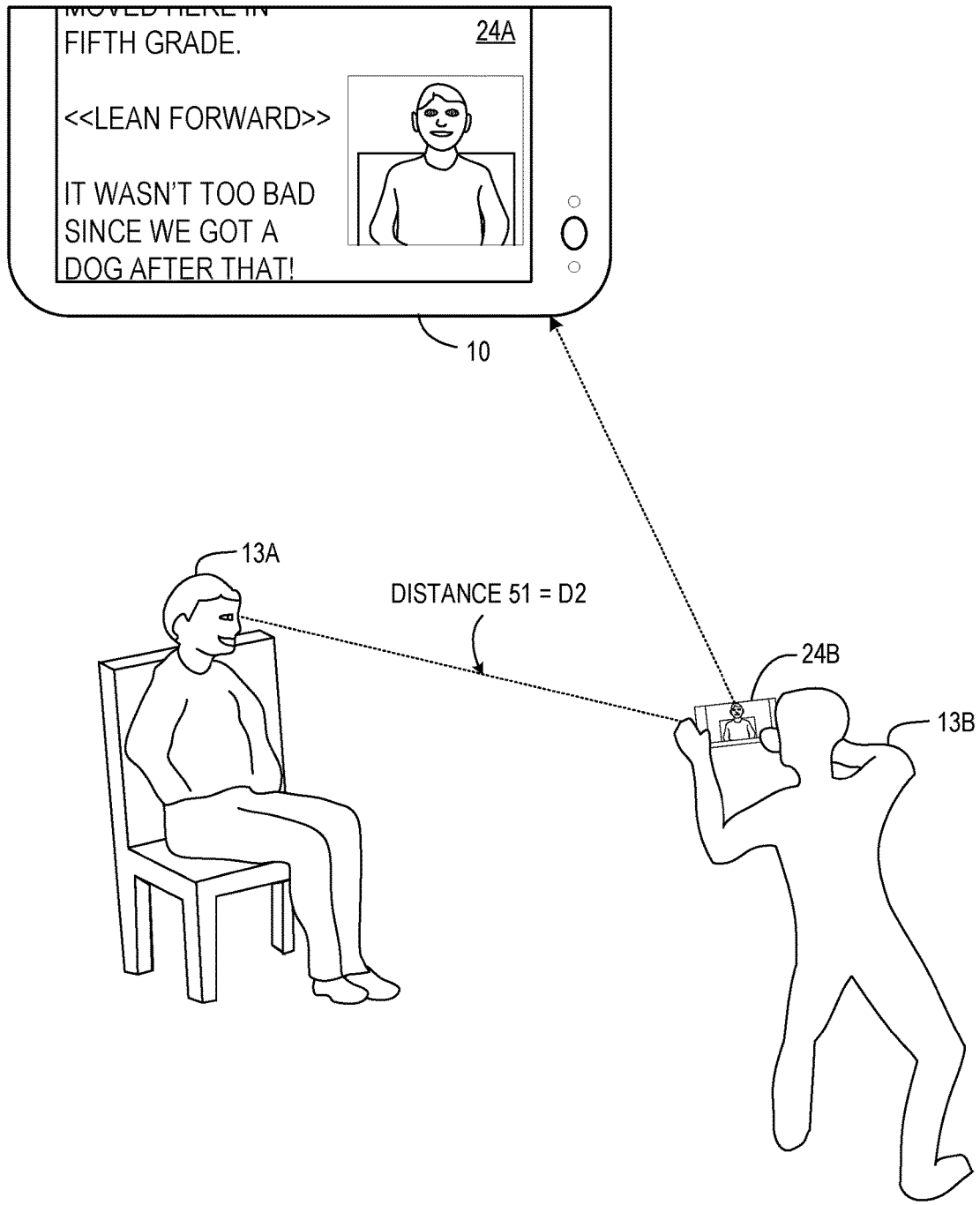

FIGS. 9A and 9B show the mobile computing device 10 adjusting text size according to a change in distance 51. In the illustrated example of FIG. 9A, the subject 36A is first located a distance D1 away from the camera 30A. The distance 51 may be estimated as D1 by the facial recognition module 52 as discussed above, or by the depth module 50 processing depth data of sensor data 54 from the depth camera 32A, for example. At this time, the display 24A displays the image data 40 and text of the secondary content 46 as shown. Then, in the example illustrated in FIG. 9B, the subject 36A is located a distance D2 away from the camera 30A. In this case, the processor 16 may be configured to estimate a change in distance 51 of the subject 36A recorded in the image data 40 from the camera 30A over time. As D2 is greater than D1, the change in the distance 51 is an increase. In response, the processor 16 may be configured to adjust a size of the text of the secondary content 46 according to the change in the distance 51 over time. Here, the text size is commensurately increased with the increase in distance 51 so that the subject 36A may be able to read the text from a long distance 51 away, but display space is not wasted on large text when the subject 36A is located a short distance 51 away.

Figure 10A:
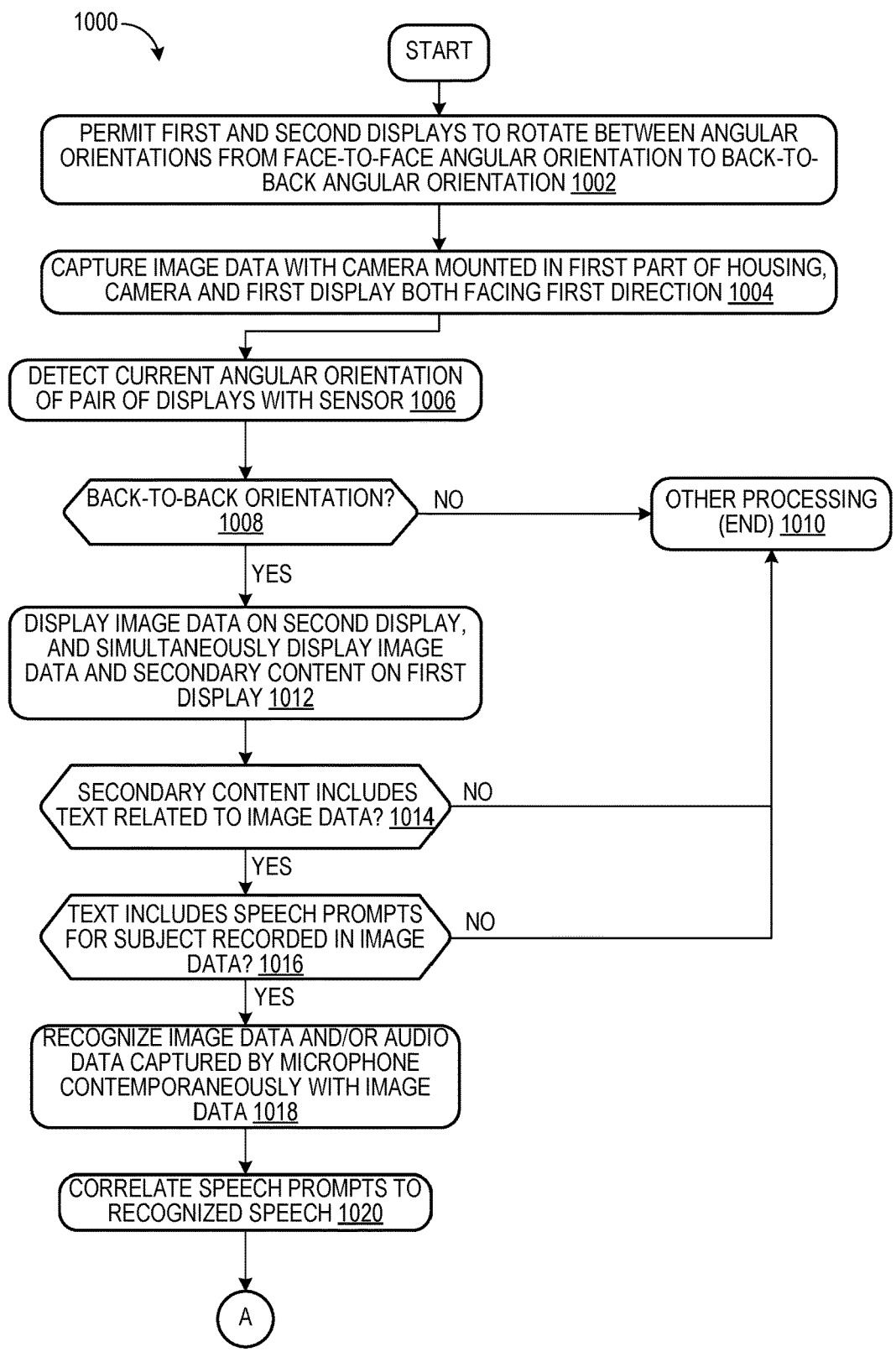
FIGS. 10A and 10B show a flowchart for an example method for operating the mobile computing device of FIG. 1.
Figure 10B:
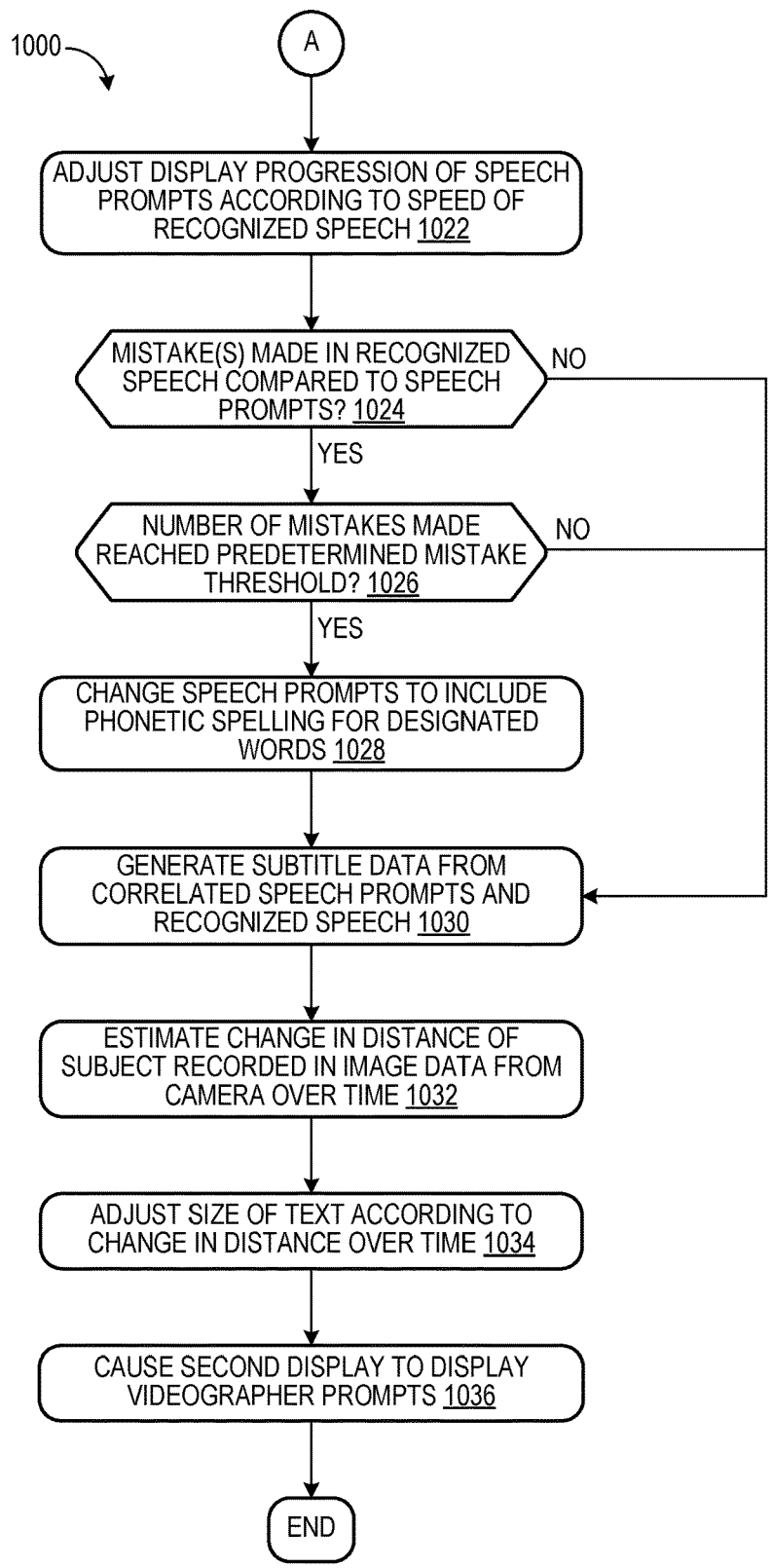

FIGS. 10A and 10B show a flowchart for an example method 1000 of operating a mobile computing device comprising a housing having a first part and a second part coupled by a hinge, the first part including a first display and the second part including a second display. The following description of method 1000 is provided with reference to the software and hardware components described above and shown in FIGS. 1-2D. It will be appreciated that method 1000 also may be performed in other contexts using other suitable hardware and software components.

With reference to FIG. 10A, at 1002 the method 1000 may include permitting the first and second displays to rotate between angular orientations from a face-to-face angular orientation to a back-to-back angular orientation. The various angular orientations are illustrated in FIGS. 2A-2D and discussed above. At 1004 the method 1000 may include capturing image data with a camera mounted in the first part of the housing, the camera and the first display both facing a first direction. At 1006 the method 1000 may optionally include detecting a current angular orientation of the pair of displays with a sensor. As discussed above, the sensor may be a hinge angle sensor or one or more IMUs, for example. If no, the method 1000 may end and the mobile computing device may proceed to other processing at 1010. If the sensor is not used at 1006, other detection methods such as comparing image data from a camera in each display or receiving user input may be substituted. If yes, at 1012 the method 1000 may include, in the back-to-back angular orientation, displaying the image data on the second display, and simultaneously displaying the image data and secondary content on the first display. The coordinated display of the image data on both displays by a single multi-screened device may allow both the user holding the device and the subject being recorded to make informed judgements on-the-fly without experiencing synchronization problems or setting up and operating multiple separate devices.

As discussed above, the secondary content may have a variety of forms. At 1014 the method 1000 may optionally include determining whether the secondary content includes text that is related to the image data. If no, the method 1000 may end at 1010. If yes, the method 1000 may optionally proceed to 1016 where it is determined whether the text includes speech prompts for a subject recorded in the image data. Speech prompts as well as action prompts may allow the subject to appear well prepared in the image data without memorizing a speech in advance. If no, the method 1000 may end at 1010. If yes, the method 1000 may optionally proceed to 1018, recognizing speech from at least one of the image data or audio data that is captured by a microphone contemporaneously with the image data. Once the speech is recognized, for example, by using one or more algorithms to identify sounds and compare them to known sounds and speech patterns, at 1020 the method 1000 may optionally include correlating the speech prompts to the recognized speech.

Turning to FIG. 10B, the method 1000 may optionally continue at 1022, adjusting a display progression of the speech prompts according to a speed of the recognized speech. As discussed above, recognizing the speech may include determining a speed or rate of the speech. If the speech speeds up, then the speech prompts may progress more quickly in order to keep up with the subject speaking, and if the speech slows down, the speech prompts may do so as well. At 1024 the method 1000 may optionally include determining whether or not a mistake is made in the recognized speech compared to the speech prompts. The mistake or mistakes may be recognized in the manner discussed above with reference to FIG. 6. If no, the method 1000 may optionally skip ahead to 1030. If yes, the method 1000 may optionally include determining whether a number of mistakes made has reached a predetermined mistake threshold. It will be appreciated that while the number of mistakes may be simply tallied, they may also be weighted due to severity, frequency, type, etc. If no, the method 1000 may optionally skip ahead to 1030. If yes, at 1028 the method 1000 may optionally include changing the speech prompts to include phonetic spelling for designated words.

Next, at 1030 the method 1000 may optionally include generating subtitle data from the correlated speech prompts and recognized speech. As discussed above, errors in the recognized speech may be differentiated from deviations from the speech prompt by the subject by taking context into account or comparing speech patterns to common or previously recorded speech patterns, for example. At 1032 the method 1000 may optionally include estimating a change in distance of a subject recorded in the image data from the camera over time. The change in distance may be estimated by determining an interpupillary distance change, using depth data from a depth camera, or other suitable method. At 1034 the method 1000 may optionally include adjusting a size of the text according to the change in the distance over time. Accordingly, smaller distances may result in smaller text, and larger distances may result in commensurately larger text. At 1036 the method 1000 may optionally include causing the second display to display videographer prompts, for example, as shown in FIG. 4 and discussed above. Accordingly, the user of the mobile computing device may receive different secondary content than the subject, such as instructions or suggestions to improve the image data being captured.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
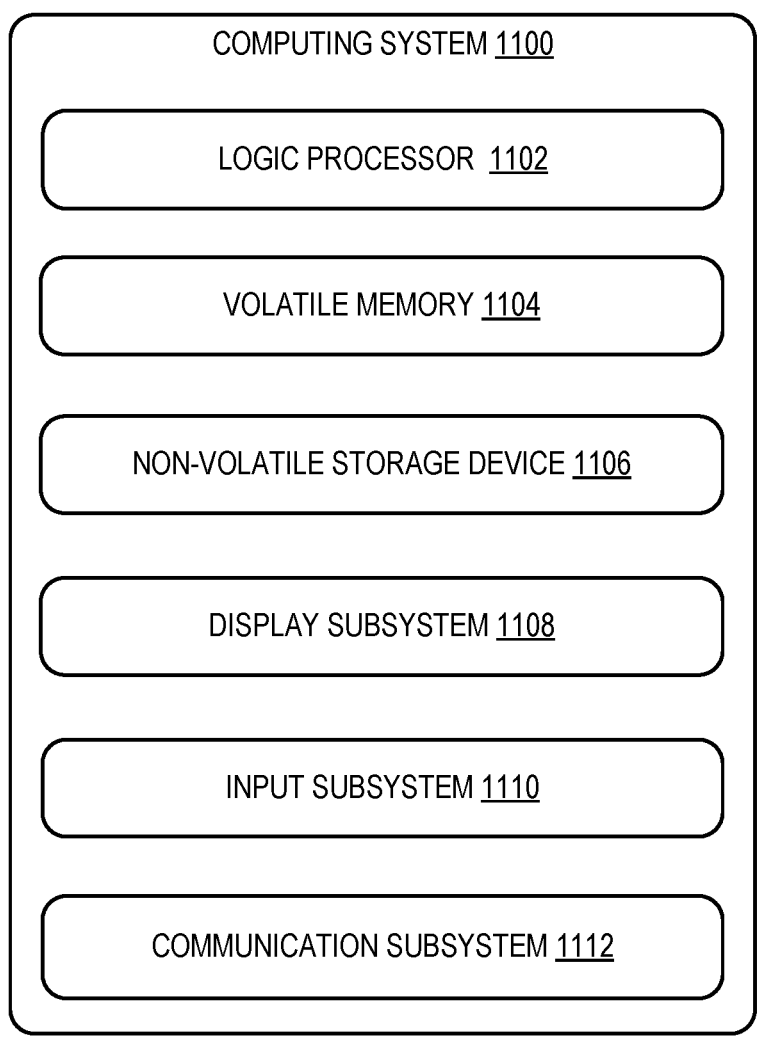
FIG. 11 shows an example computing system according to an embodiment of the present description.

FIG. 11 schematically shows a non-limiting embodiment of a computing system 1100 that can enact one or more of the methods and processes described above. Computing system 1100 is shown in simplified form. Computing system 1100 may embody the mobile computing device 10 of FIG. 1. Computing system 1100 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head-mounted augmented reality devices.

Computing system 1100 includes a logic processor 1102, volatile memory 1104, and a non-volatile storage device 1106. Computing system 1100 may optionally include a display subsystem 1108, input subsystem 1110, communication subsystem 1112, and/or other components not shown in FIG. 11.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built-in. Non-volatile storage device 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 1100 typically implemented in software by a processor to perform a particular function using portions of volatile memory, which function involves transformative processing that specially configures the processor to perform the function. Thus, a module or program may be instantiated via logic processor 1102 executing instructions held by non-volatile storage device 1106, using portions of volatile memory 1104. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

The subject matter of the present disclosure is further described in the following paragraphs. One aspect provides a mobile computing device comprising a housing having a first part and a second part coupled by a hinge, the first part including a first display and the second part including a second display, wherein the hinge is configured to permit the first and second displays to rotate between angular orientations from a face-to-face angular orientation to a back-to-back angular orientation, a camera mounted in the first part of the housing and configured to capture image data, the camera and the first display both facing a first direction, and a processor mounted in the housing. In the back-to-back angular orientation, the processor is configured to cause the second display to display the image data while simultaneously causing the first display to display the image data and secondary content. In this aspect, the mobile computing device further comprises a sensor mounted in the housing and configured to detect an angular orientation of the pair of displays. In this aspect, the secondary content includes text that is related to the image data. In this aspect, the text includes speech prompts for a subject recorded in the image data. In this aspect, the processor is further configured to recognize speech from at least one of the image data or audio data that is captured by a microphone contemporaneously with the image data, and correlate the speech prompts to the recognized speech. In this aspect, the processor is further configured to adjust a display progression of the speech prompts according to a speed of the recognized speech. In this aspect, the processor is further configured to determine whether or not a mistake is made in the recognized speech compared to the speech prompts, and when a number of mistakes made reaches a predetermined mistake threshold, change the speech prompts to include phonetic spelling for designated words. In this aspect, the processor is further configured to generate subtitle data from the correlated speech prompts and recognized speech. In this aspect, the processor is further configured to estimate a change in distance of a subject recorded in the image data from the camera over time, and adjust a size of the text according to the change in the distance over time. In this aspect, the processor is further configured to cause the second display to display videographer prompts. In this aspect, the processor is further configured to determine portions of the audio data that are not the recognized speech, filter the portions from the audio data, and store or transmit a remaining portion of the audio data that does not include the filtered portions.

According to another aspect, a method of operating a mobile computing device comprising a housing having a first part and a second part coupled by a hinge, the first part including a first display and the second part including a second display, is provided. The method comprises permitting the first and second displays to rotate between angular orientations from a face-to-face angular orientation to a back-to-back angular orientation, capturing image data with a camera mounted in the first part of the housing, the camera and the first display both facing a first direction, and in the back-to-back angular orientation, displaying the image data on the second display, and simultaneously displaying the image data and secondary content on the first display. In this aspect, the method further comprises detecting an angular orientation of a hinge with a sensor mounted in the housing, and determining a current angular orientation of the pair of displays based on the angular orientation of the hinge. In this aspect, the secondary content includes text that is related to the image data. In this aspect, the text includes speech prompts for a subject recorded in the image data. In this aspect, the method further comprises recognizing speech from at least one of the image data or audio data that is captured by a microphone contemporaneously with the image data, and correlating the speech prompts to the recognized speech. In this aspect, the method further comprises adjusting a display progression of the speech prompts according to a speed of the recognized speech. In this aspect, the method further comprises determining whether or not a mistake is made in the recognized speech compared to the speech prompts, and when a number of mistakes made reaches a predetermined mistake threshold, changing the speech prompts to include phonetic spelling for designated words. In this aspect, the method further comprises generating subtitle data from the correlated speech prompts and recognized speech. In this aspect, the method further comprises estimating a change in distance of a subject recorded in the image data from the camera over time, and adjusting a size of the text according to the change in the distance over time.

According to another aspect, a mobile computing device comprises a housing having a first part and a second part coupled by a hinge, the first part including a first display and the second part including a second display, wherein the hinge is configured to permit the first and second displays to rotate between angular orientations from a face-to-face angular orientation to a back-to-back angular orientation, a camera mounted in the first part of the housing and configured to capture image data, the camera and the first display both facing a first direction, a sensor mounted in the housing and configured to detect an angular orientation of the pair of displays, and a processor mounted in the housing. In the back-to-back angular orientation, the processor is configured to cause the second display to display the image data while simultaneously causing the first display to display the image data and text that is related to the image data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device comprising:
a housing having a first part and a second part coupled by a hinge, the first part including a first display and the second part including a second display, wherein the hinge is configured to permit the first and second displays to rotate between angular orientations from a face-to-face angular orientation to a back-to-back angular orientation;
a camera mounted in the first part of the housing and configured to capture image data, the camera and the first display both facing a first direction; and
a processor mounted in the housing, configured to:
in the back-to-back angular orientation, to cause the first display to display the image data and speech prompts for a subject recorded in the image data while concurrently causing the second display to display the image data and not the speech prompts,
recognize speech from at least one of the image data or audio data that is captured by a microphone contemporaneously with the image data,
correlate the speech prompts to the recognized speech,
determine whether or not a mistake is made in the recognized speech compared to the speech prompts, and
when a number of mistakes made reaches a predetermined mistake threshold, change the speech prompts to include phonetic spelling for designated words.

2. The mobile computing device of claim 1, further comprising a sensor mounted in the housing and configured to detect an angular orientation of the pair of displays.

3. The mobile computing device of claim 1, wherein the processor is further configured to:
adjust a display progression of the speech prompts according to a speed of the recognized speech.

4. The mobile computing device of claim 1, wherein the processor is further configured to:
generate subtitle data from the correlated speech prompts and recognized speech.

5. The mobile computing device of claim 1, wherein the processor is further configured to:
determine portions of the audio data that are not the recognized speech;
filter the portions from the audio data; and
store or transmit a remaining portion of the audio data that does not include the filtered portions.

6. The mobile computing device of claim 1, wherein the processor is further configured to:
estimate a change in distance of the subject recorded in the image data from the camera over time; and
adjust a size of the speech prompts according to the change in the distance over time.

7. The mobile computing device of claim 1, wherein the processor is further configured to cause the second display to display videographer prompts.

8. A method of operating a mobile computing device comprising a housing having a first part and a second part coupled by a hinge, the first part including a first display and the second part including a second display, the method comprising:
permitting the first and second displays to rotate between angular orientations from a face-to-face angular orientation to a back-to-back angular orientation;
capturing image data with a camera mounted in the first part of the housing, the camera and the first display both facing a first direction;
in the back-to-back angular orientation, displaying the image data and speech prompts for a subject recorded in the image data on the first display while concurrently displaying the image data and not the speech prompts on the second display;

recognizing speech from at least one of the image data or audio data that is captured by a microphone contemporaneously with the image data;

correlating the speech prompts to the recognized speech;

determining whether or not a mistake is made in the recognized speech compared to the speech prompts; and when a number of mistakes made reaches a predetermined mistake threshold, changing the speech prompts to include phonetic spelling for designated words.

9. The method of claim 8, further comprising:

detecting an angular orientation of a hinge with a sensor mounted in the housing; and determining a current angular orientation of the pair of displays based on the angular orientation of the hinge.

10. The method of claim 8, further comprising:

adjusting a display progression of the speech prompts according to a speed of the recognized speech.

11. The method of claim 8, further comprising:

generating subtitle data from the correlated speech prompts and recognized speech.

12. The method of claim 8, further comprising:

determining portions of the audio data that are not the recognized speech;

filtering the portions from the audio data; and storing or transmitting a remaining portion of the audio data that does not include the filtered portions.

13. The method of claim 8, further comprising:

estimating a change in distance of the subject recorded in the image data from the camera over time; and adjusting a size of the speech prompts according to the change in the distance over time.

14. The method of claim 8, further comprising causing the second display to display videographer prompts.

15. A mobile computing device comprising:

a housing having a first part and a second part coupled by a hinge, the first part including a first display and the second part including a second display, wherein the hinge is configured to permit the first and second displays to rotate between angular orientations from a face-to-face angular orientation to a back-to-back angular orientation;

a camera mounted in the first part of the housing and configured to capture image data, the camera and the first display both facing a first direction;

a sensor mounted in the housing and configured to detect an angular orientation of the pair of displays; and a processor mounted in the housing, configured to:

in the back-to-back angular orientation, cause the first display to display the image data and speech prompts for a subject recorded in the image data while concurrently causing the second display to display the image data and not the speech prompts, recognize speech from at least one of the image data or audio data that is captured by a microphone contemporaneously with the image data, correlate the speech prompts to the recognized speech, and generate subtitle data from the correlated speech prompts and recognized speech.

16. The mobile computing device of claim 15, wherein the processor is further configured to:

adjust a display progression of the speech prompts according to a speed of the recognized speech.

17. The mobile computing device of claim 15, wherein the processor is further configured to:

determine whether or not a mistake is made in the recognized speech compared to the speech prompts; and when a number of mistakes made reaches a predetermined mistake threshold, change the speech prompts to include phonetic spelling for designated words.

18. The mobile computing device of claim 15, wherein the processor is further configured to:

determine portions of the audio data that are not the recognized speech;

filter the portions from the audio data; and store or transmit a remaining portion of the audio data that does not include the filtered portions.

19. The mobile computing device of claim 15, wherein the processor is further configured to:

estimate a change in distance of the subject recorded in the image data from the camera over time; and adjust a size of the speech prompts according to the change in the distance over time.

20. The mobile computing device of claim 15, wherein the processor is further configured to cause the second display to display videographer prompts.

* * * * *